United States Patent [19]

Traynor

[11] Patent Number: 4,689,792
[45] Date of Patent: Aug. 25, 1987

[54] SELF TEST SEMICONDUCTOR MEMORY WITH ERROR CORRECTION CAPABILITY

[75] Inventor: Kevin Traynor, Albuquerque, N. Mex.

[73] Assignee: Texas Instruments Incorporated, Dallas, Tex.

[21] Appl. No.: 772,117

[22] Filed: Sep. 3, 1985

[51] Int. Cl.[4] .............................................. G06F 11/10
[52] U.S. Cl. ..................................................... 371/38
[58] Field of Search ....................... 371/13, 38, 51, 21; 365/201

[56] References Cited

U.S. PATENT DOCUMENTS

| 4,175,692 | 11/1979 | Watanabe | 371/38 |
| 4,319,356 | 3/1982 | Kocol | 371/38 |
| 4,335,459 | 6/1982 | Miller | 371/38 |
| 4,336,611 | 6/1982 | Bernhardt | 371/38 |
| 4,523,314 | 6/1985 | Burns | 371/38 |

OTHER PUBLICATIONS

Conzala, et al., "Error Correction Without Speed Degradation", IBM TDB, vol. 10, No. 8, 1/1968, pp. 1275-1276.

Primary Examiner—Jerry Smith
Assistant Examiner—Robert W. Beausoliel, Jr.
Attorney, Agent, or Firm—John G. Graham; Rodney M. Anderson

[57] ABSTRACT

A self testing ROM includes an information array (10) for storing data therein and a parity array (12) for storing associated parity information for each of the data words. The data is accessed and multiplexed for input to a block code error detect circuit (30) for detecting the error and outputting an error syndrome on a bus (32). The error syndrome is input to an error correct circuit (34) for correction of the accessed data during a first pass through the error detect circuit (30). This corrected data is then input to latches (39) and (41). The latched data is then input back to the block code error detect circuit (30) during a second pass to determine if the data was corrected. If not, this indicates that there were too many errors to be corrected by the error detection algorithm. This is detected with a system error detect circuit (43) during the second pass through the block code error detect circuit (30). Each of the addresses in the arrays (10) and (12) are stepped through and processed through the block code error detect circuit (30) twice.

13 Claims, 8 Drawing Figures

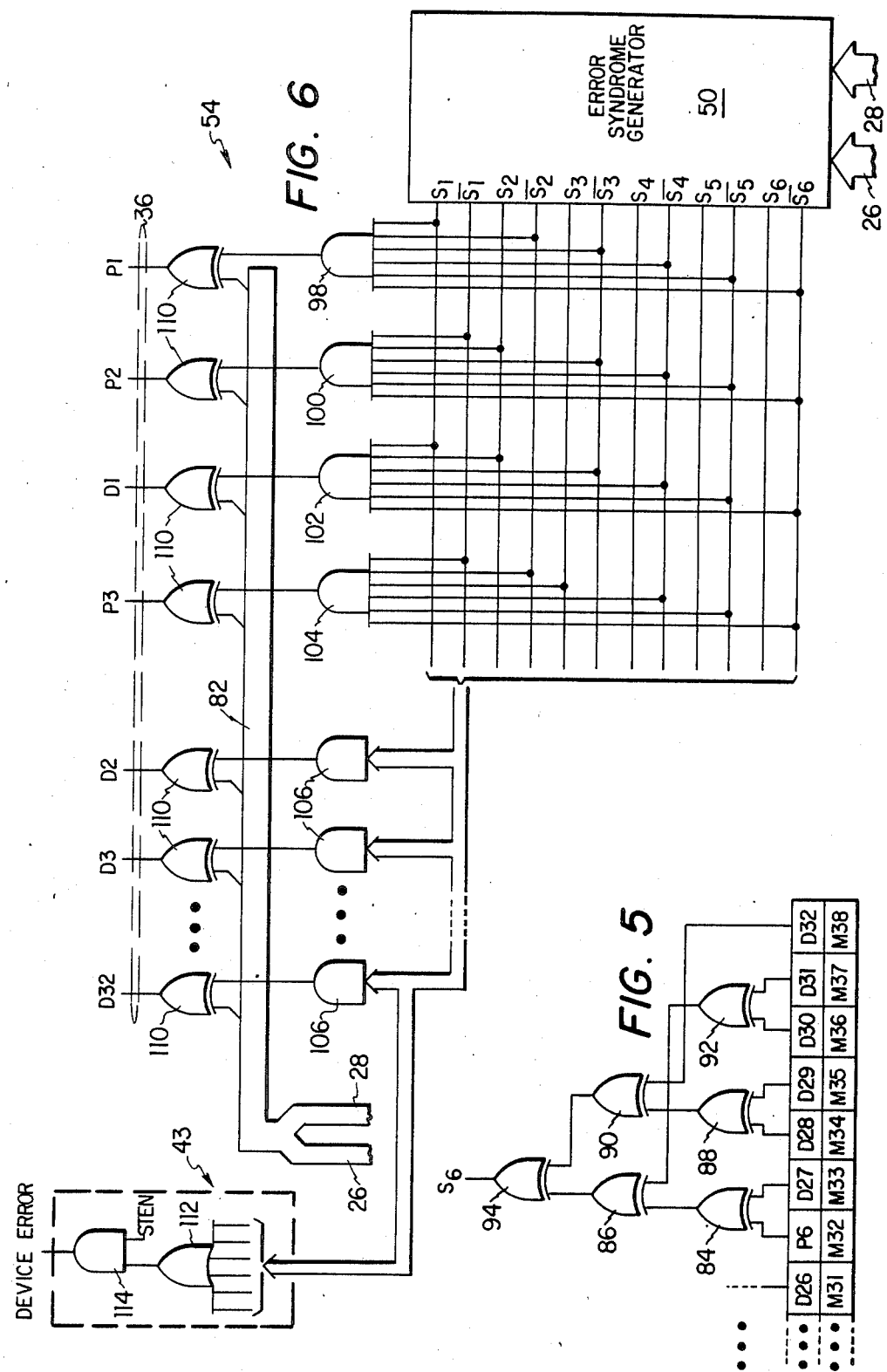

SELF TEST SEMICONDUCTOR MEMORY WITH ERROR CORRECTION CAPABILITY

TECHNICAL FIELD OF THE INVENTION

The present invention pertains in general to semiconductor memories and, more particularly, to self testing of memories utilizing an error detection/correction code.

CROSS REFERENCE TO RELATED APPLICATION

This application is related to patent application Ser. No. 753,834, patent application Ser. No. 796,367.

BACKGROUND OF THE INVENTION

Advances in semiconductor technology and especially in the areas of semiconductor memories have led to higher semiconductor chip density and complexity. This results in tight geometries which have associated therewith process control problems occasionally resulting in failures in bit cells of the array. The failure etiology is frequently column related (as opposed to row related) resulting in defective columns of bit cells. However, the failure of a single bit in a large memory array of, for example, 64,000 memory cells still constitutes a failure of the entire device.

To increase yield in a semiconductor memory array, such techniques as redundancy and error detection/correction schemes have been utilized. Redundancy is especially suited for repetitive circuits such as memory arrays wherein a portion of the circuits such as a column of memory cells is repeated on the chip. At test, it is then only necessary to either open a laser type fuse to insert the redundant circuit for the defective circuit or activate an electronic switching interface to make the replacement. One type of redundant circuit is discussed in patent application Ser. No. 693,417, (now U.S. Pat. No. 4,598,388) assigned to Texas Instruments Incorporated. Another device is disclosed in U.S. Pat. No. 4,471,472, issued to E. S. Young on Sept. 11, 1984 and assigned to Advanced Microdevices, Inc. Redundant circuits, however, require a defined amount of silicon surface area or "overhead" for implementation thereof. In addition, redundant circuits must be activated during the manufacturing phase with the redundancy provided therefor constrained within the limits of the redundant circuit. Partial redundancy works well only with Read/Write memories. Read Only Memories (ROM's) need 100% redundancy.

The second technique for increasing yield on a high density semiconductor memory array is to utilize an error detecting and correcting code. Such codes usually contain two kinds of digits: information or message digits, and check or parity digits. Since the probability for the simultaneous appearance of two or more errors is much smaller than for single errors, attention is frequently focused on detecting and correcting only single bit errors. To implement an error detection/correction code, it is necessary not only to store the information digits but also to store corresponding parity information. The most widely used single error detecting code is the odd/even parity code, in which one parity bit is added to every code word. For the odd/even parity check, the additional bit is chosen so that the sum of all logic 1's and the data word, including this parity bit, is odd or even.

The odd/even parity error detecting code requires addition of an extra bit to each code word and is sometimes referred to as "horizontal" parity checking. If, however, the code words of a longer message are arranged in an array of n rows and m columns, then, besides the horizontal parity bit added to each row, another "vertical" parity bit may also be added to each column. This is referred to as a block parity error correcting code. The error can be detected either from the horizontal parity bit or from the vertical parity bit.

Another type of error correcting code is the Hamming code which is one of the more important single error detecting and correcting codes. This code can not only detect and correct single error codes but can also detect double errors. Such devices have been developed for use external to a semiconductor memory. The data word output by the memory along with its parity information is input to the error/detection circuit in order to detect if there is an error. If an error exists, this error is corrected and the corrected data word output therefrom. An error/detection circuit of this type is manufactured under the Part No. 2960 by Advanced Micro Devices. Examples of applications of other error detection/correction codes can be bound in U.S. Pat. Nos. 4,479,214; 4,494,234; 4,497,058; 4,498,175; 4,506,365 and 4,468,769.

Although error detection/correction codes provide the capability to correct single or multiple errors, testing of the device is still a necessity. For a ROM, this testing requires each location to be addressed and compared with a predetermined code. If an error is present that is not correctable, the device is defective. This testing is time consuming and is also a source of error. In view of these disadvantages, there exists a need for a memory that is more error tolerant and simpler to test.

SUMMARY OF THE INVENTION

The present invention disclosed and claimed herein comprises a self testing semiconductor memory. The memory includes an information storage array for storing a plurality of digital data words and a parity array for storing parity information corresponding to each of the data words stored in the information array. The parity information is generated in accordance with a block code error algorithm such as a Hamming code, the data words and the parity bits forming a coded data word. Access circuitry is provided for accessing one of the coded data words in response to receiving an external row and column address. The accessed data is input to an error detect circuit for detecting an error in accordance with the block code error algorithm. An error syndrome is generated indicating the bit position of the detected error in the coded data word. An error correct circuit is provided for receiving the error syndrome and the coded word and correcting the bit in error. A multiplexer selects between the output of the error correction circuit and the output of the information and parity arrays to either input an accessed one of the coded data words or the corrected one of the coded data words to the error detect circuit. Self test is provided by inputting the accessed data from the arrays during a first pass to both the error detect circuit and the error correct circuit for correcting the accessed coded data word. During a second pass, the corrected coded data word is latched and input to the error detect circuit to determine if an error is still present. This error is detected during the second pass to output a system error signal if an error is indicated.

In yet another embodiment of the present invention, two additional bits are added to the coded data words. These additional bits make up a part of the digital data word. The parity bits are generated in accordance with the two additional bits in the data word and stored in the parity array. The two additional bits are hardwired into the error detect circuit such that errors in the information and parity arrays do not affect the logic states of these two additional bits. The logic states of the two additional bits are opposite to each other such that a data word having all "1's" or "0's'8 cannot occur, which would result if a word line were opened.

BRIEF DESCRIPTION OF THE DRAWINGS

For a more complete understanding of the present invention and the advantages thereof, reference is now made to the following description taken in conjunction with the accompanying Drawings in which:

FIG. 5 illustrates a partial logic diagram of the syndrome generator for generating the error syndrome;

FIG. 6 illustrates a logic diagram for the error correcting circuitry and system error detector;

DETAILED DESCRIPTION OF THE INVENTION

Figure 1:
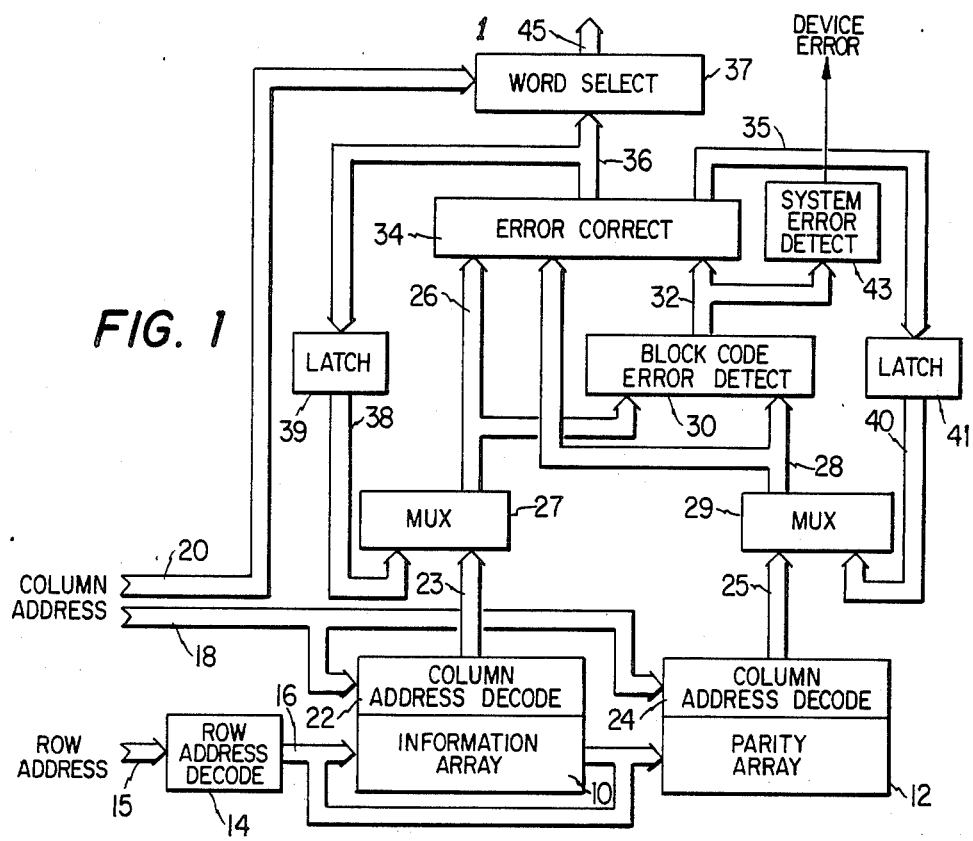
FIG. 1 illustrates a schematic block diagram of a self testing Read Only Memory (ROM) of the present invention.

Referring now to FIG. 1, there is illustrated a schematic block diagram of a semiconductor memory utilizing the error detection/correction circuitry and self testing feature of the present invention. The memory is comprised of an information memory array 10 and a parity memory array 12. Each of the arrays 10 and 12 are formed from an array of memory elements arranged in rows and columns. The memory elements can either be of the Read Only Memory type (ROM) or of the Random Access Memory type (RAM) wherein the memory elements are first loaded with a pattern of data. In the preferred embodiment, the self test feature is utilized with a ROM. The typical structure of a ROM is illustrated in U.S. Pat. No. 3,934,233, issued to Fisher et al. on Jan. 20, 1976 and assigned to Texas Instruments Incorporated. The structure of a RAM is illustrated in U.S. Pat. No. 4,330,852, issued May 18, 1982 to Redwine, et al. and U.S. Pat. No. 4,347,587, issued to Rao on Aug. 31, 1982, both assigned to Texas Instruments Incorporated. Regardless of the structure of the array 10 or 12, it is only important that information be extractable from the memory array.

Data is stored in the information array 10 in the form of data words grouped into a collective data word. In the preferred embodiment, four eight bit data words form one of the collective data words. Each of the collective data words has a predetermined number of "check bits" or "parity bits" associated therewith and stored in the parity array 12. As will be described hereinbelow, self testing of the ROM is facililated by first accessing one of the collective data words and the associated parity bits, checking for errors and then correcting the error if necessary. The corrected data word is then checked for errors and, if an error is still present, an indication is provided that the device is defective. This accessing step and error checking of the corrected data word is repeated for each collective data word stored in the memory.

The information array 10 is addressed by a column address and a row address. The row address is input to row address decoder 14 on an address bus 15 to select one of a plurality of word lines which are represented by a word line bus 16. The output of the row address decoder 14 is mutually exclusive such that only one row in both the information array 10 and the parity array 12 is selected. The column address is divided into an output select portion comprised of lower order address bits and an array select portion comprised of the higher order address bits. The array select portion is input to the semiconductor memory on a bus 18 and the output select portion is input on a bus 20. The array select portion of the column address on the bus 18 is input to a column address decoder 22 associated with the information array 10 and a column address decoder 14 associated with the parity array 12. After the column and row addresses are generated and the collective data word stored in the information array 10 and the associated bits stored in the parity array 12 are accessed, the accessed collective data word is output on a data bus 23 for input to a multiplexer 27 and the accessed check bits are output on a data bus 25 for input to a multiplexer 29. The multiplexer 27 is output to a data bus 26 and the multiplexer 29 is output to a data bus 28.

The collective data word on the data bus 26 and the parity bits on the data bus 28 are both input to a block code error detect circuit 30. The block code error detect circuit 30 is operable to generate an error correction code in accordance with the predetermined error detection/correction algorithm to determine which bit, if any, in the accessed data is in error. An error syndrome is then generated and output on an error syndrome bus 32 for input to an error correction circuit 34. The collective data word on the data bus 26 and the parity information on the data bus 28 are also input to the error correction circuit 34. The error correction circuit outputs the corrected collective data word onto a data bus 36 and the corrected parity bits onto a data bus 35. The bus 36 is input to a data word select circuit 37 and also to a latch 39. The data bus 35 is input to a latch 41. The data word select circuit is operable to select the desired one of the data words from the corrected collective data word, as defined by the lower order bits on the address bus 20 which are input thereto. In the preferred embodiment, the data word select circuit 37 is a four-to-one demultiplexer.

In the present invention, the bit length of the data stored in the information array 10 is longer than the bit length of a single data word. Therefore, the block code error detect circuit 30 operates on a larger number of data bits than are required for a conventional error correcting scheme. As will be described hereinbelow, this requires less parity bits and, thus, less storage is required in the parity memory array 12. In addition, less passes must be made through the memory in order to test all locations therein.

The latch 39 has the output thereof connected to the remaining input of the multiplexer 27 through a data bus 38 and the latch 41 has the output thereof input to the remaining input of the multiplexer 29. The latches 39 and 41 and multiplexers 27 and 29 allow the corrected collective data word and corrected parity bits to be input to the block code error detection circuit 30 to determine if an error is still present. A system error detect circuit 43 is connected to the error syndrome bus 32 to determine the presence of an error on the second pass through the error detection circuit 30. If an error is present on the second pass, a SYSTEM ERROR signal is generated indicating that the collective data word and/or parity bits were not corrected on the first pass, thus classifying the device as defective.

In the self test operation, a data word is accessed and the multiplex circuits 27 and 29 select the output buses 23 and 25, respectively, to obtain both the selective data word and the associated parity bits. This information is input to the block code error detect circuit 30 and then the collective data word and the parity information corrected in the error correct circuit 34. A corrected collective data word is then output on bus 36 and corrected parity bits output on bus 35. This constitutes the first pass in the test procedure. In the second pass, the collective data word is latched in the latch 39 and the corrected parity bits are latched in the latch 41. The multiplexers 27 and 29 select the buses 38 and 40, respectively, for input thereto. Therefore, a corrected collective data word is placed on bus 26 and corrected parity bits are placed on bus 28. This information is then processed through the block code error detect circuit 30 and an error syndrome generated on error syndrome bus 32. As will be described hereinbelow, the error syndrome has a value of zero when no error is present and a higher value when an error is present. This higher value denotes the bit position of the error in either the collective data word or the parity bits. If the error was correctable by the block code error detect circuit 30 during the first pass, there should be no error present in the second pass. If, however, the error was such that it could not be corrected by the block code error detect circuit 30, an error will still be present. The system error detect circuit 43 samples the error syndrome during the second pass and, if an error is indicated, the SYSTEM ERROR signal will indicate so. As will be described hereinbelow, the error detect/correct algorithm is operable to correct a single bit error. If two bits are in error, the output is indeterminant and the error correction circuit 34 will randomly correct only a single bit in either the collective data word or the parity bits. Obviously, an error will remain and, during the second pass, this error will be reflected in the error syndrome on the error syndrome bus 32. The system error detect circuit 43 detects this error and outputs the DEVICE ERROR signal.

To test the entire ROM, it is then only necessary to step through the addresses externally or include an internal counter and instruction register for stepping through the ROM addresses. This alleviates the necessity for having to output the data word and compare the output data word with a customer's program to determine if the ROM is good. With the circuit of the present invention, it is only necessary to internally step through the addresses and pass the accessed data through the error detect/correct circuit twice in order to completely test the ROM without the requirement to compare the accessed data with a reference data word.

In the preferred embodiment, the information array 10 is 1024 bits wide with the column address decoder 22 accessing a collective data word having a bit length of 32 bits such that there are thirty two 32-bit length collective data words in each row of the information array 10. In the corresponding row in the parity array 12, each collective data word has associated therewith six check bits. Therefore, the parity array 12 has thirty two groups of parity bits having six bits in each group for a total width of 192 bits. The information data bus 26 is therefore 32 bits wide and the parity data bus 28 six bits wide.

The block code error detect circuit 30 in the preferred embodiment utilizes a Hamming single error detecting and correcting code. However, it should be understood that some other suitable block code such as a Reed-Muller or Golay code could be utilized. The error correction code on the bus 32 contains information regarding the error in the form of the relative position within the 32 bit collective data word accessed and output on data bus 26. It is then only necessary to invert the bit in error to output a correct data word. The error correction circuit 34 facilitates this correction and the data word select circuit 37 selects a smaller segment data word for output on a bus 45 in accordance with the output select portion of the column address on bus 20. In this manner, a sixteen bit data word, an eight bit data word or a four bit data word can be output with the error correction being performed on a 32 bit data word. This results in a smaller number of parity bits to perform the error correction. For example, a 32 bit word would require only six parity bits whereas four eight bit data words would require four parity bits each for a total of sixteen parity bits. Further, fewer accesses need to be made to self test the ROM since each access cycle selects four data words.

Figure 2:
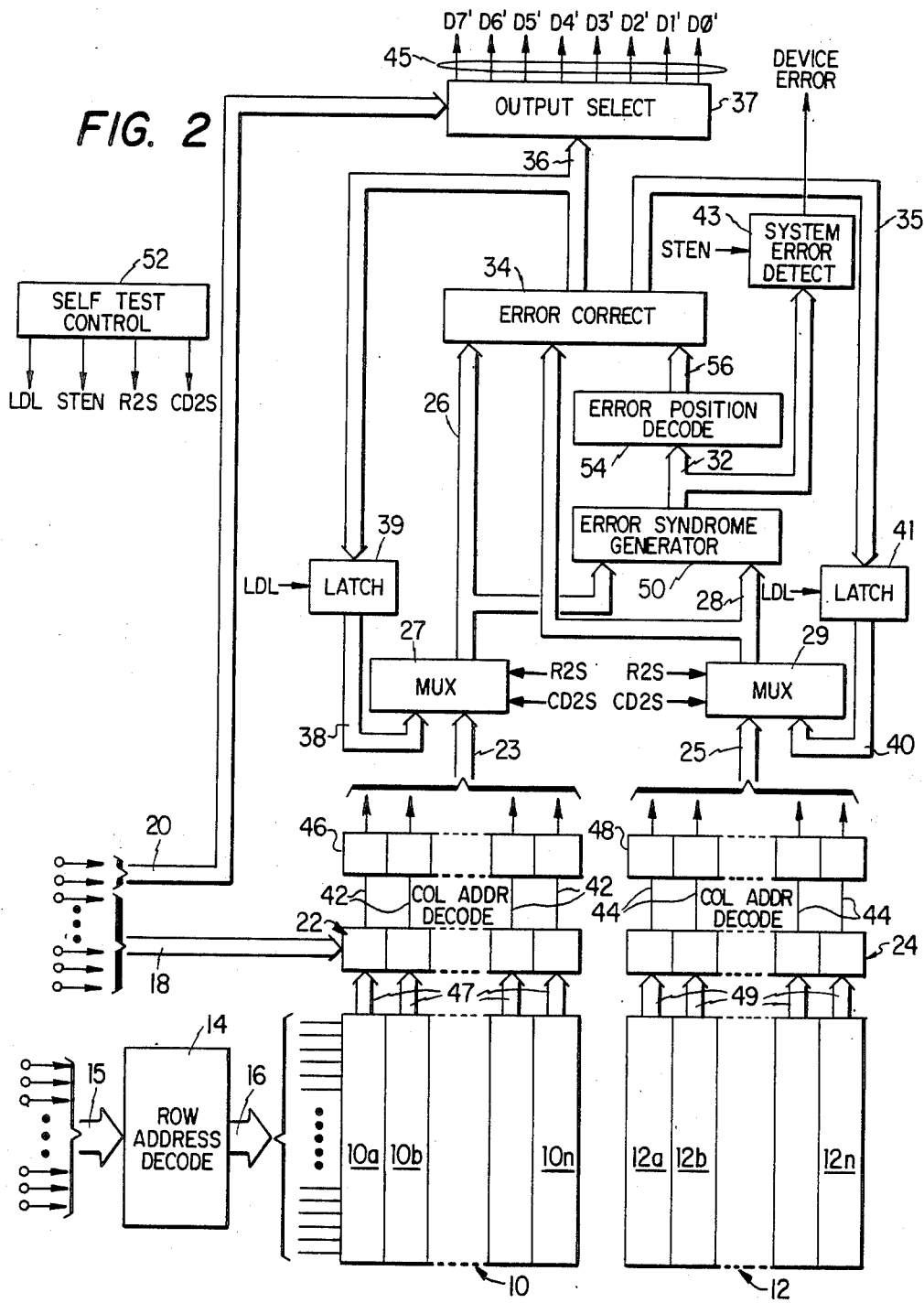
FIG. 2 illustrates an expanded block diagram of the memory.

Referring now to FIG. 2, there is illustrated an expanded block diagram of the error detect/correct memory of FIG. 1 wherein like numerals refer to like parts in the various Figures. The information array 10 is organized such that all of the bits corresponding to a similar bit position in the collective data words in a given row of memory elements are arranged in adjacent columns 10a-10n. For example, the bits in the first position of each of the thirty-two 32 bit collective data words are disposed in column 10a and adjacent each other. In a similar manner, the parity bits are arranged in columns of adjacent bits labeled from 12a-12n.

The bit lines output from each of the column groups 10a-10n are represented by a reference numeral 47 and the bit lines output from each of the column groups 12a-12n in the parity array 12 are represented by a reference numeral 49. Each of the bit lines groups 47 are input to a separate bit line select circuit 22a-22n in the column address decoder 22. Each of the bit line groups 49 are input to a bit line select circuit 24a-24n in the column address decoder 24. The selected bit lines from the bit line select circuits 22a-22n are output on lines 42 to sense amps 46 for input to the bus 23. The selected bit lines from the bit line select circuits 24a-24n are output on lines 44 to sense amps 48 for output onto the bus 25.

As described above, the length of the word accessed from the information array is 32 bits and the number of associated parity bits accessed from the parity array 12 is six bits. Therefore, there are 32 column groups in the information array 10 and six column groups in the parity array 12. This results in a 32 bit word output on the bus 23 and a six bit word output on the bus 25. By so arranging the array, a defect in adjacent bits in a given row in the array will not result in a defect in adjacent bits in an accessed word, since adjacent bits in an accessed word are physically separated by the number of 32 bit words, or thirty-one bits for a given row.

In the preferred embodiment, a Hamming code is utilized as the error detection algorithm. This requires the generation of an "error syndrome" by an error syndrome generator 50 which comprises the block code error detect circuit 30 of FIG. 1. The syndrome generator 50 outputs a digital data word indicating the position at which an error exists in the word. This error syndrome is input through the bus 32 to an error position decode circuit 54. The error position decode circuit 54 outputs a bit error position signal on a bus 56 indicating the position of the bit that is in error, if there is an error. There is one output for each bit of the 32 bit data word and one output for each of the six parity bits, the outputs being mutually exclusive.

The error correct circuit 34 receives at its input the 32 bit collective data word from the data bus 26, the six bits of parity from the bus 28 the bit error signal form the bus 56. The collective data word has the bit in error corrected by inversion thereof and output on the bus 36 to the output select circuit 27. In the normal operating mode, the output select circuit 37 selects one of the four eight bit data words forming the collective data word and outputs an eight bit data word D0'-D7' on the bus 45. In the self test mode, the corrected collective data word and the corrected parity bits are input to latches 39 and 41, respectively and then to the input of the error syndrome generator 50 through multiplexers 27 and 29, respectively. The indication of an error during this "second" pass is then detected by the device error detect circuit 43. As will be described hereinbelow, error correction on a thirty-two bit word requires significantly less overhead for storage of the parity bits needed to provide the error detection/correction as compared to storing four eight bit words independently with their associated parity information. In addition less passes through the array are required to access all locations therein.

In order to control the self testing function, a self test control circuit 52 is provided. The self test control circuit 52 generates load signals LDL to control the latches 39 and 41 and generates timing signals CD2S and R2S to control the operation of the multiplexers 27 and 29. In addition, a self test enable signal STEN for controlling the device error detect circuit 43. The STEN signal activates the detector during the second pass to determine if an error is detected. This will be described in more detail hereinbelow with reference to the timing diagrams of FIG. 7.

In order to better describe the operation of the present invention, a description of the Hamming code will be undertaken. As described above, the Hamming code is a single error detecting and correcting code which is sometimes referred to as a "distance-3" code which can also detect double errors. The Hamming code is formed by first determining the number of check bits or parity bits required. In each binary message of n information bits ($D_n$, $D_{n-1}$, ... $D_1$) to be transmitted, k parity bits ($P_k$, $P_{k-1}$ ... $P_1$) are added for checking even (or odd) parity over various combinations of information bits. In the preferred embodiment, even parity is utilized. Thus, a composite or "coded" message of n+k bits is formed. The parity bits $P_i$ (i equals 1, 2, ... k) occupy specific positions in the coded (n+k-bit message). Although the collective data word and associated parity bits were described with reference to FIGS. 1 and 2 as being organized in a separate information array 10 and separate parity array 12, in practice, these would be interleaved as a "coded message". These positions are 1, 2, 4, 8, ... $2^{k-1}$, i.e., positions that are integer powers of 2. The value of each $P_i$ is determined by checking the parity of specific locations in the original data message as shown in Table 1 for messages of up to fifteen bits with eleven data and four parity bits. Thus, the parity bit $P_1$ checks all odd positions, 1, 3, 5, 7, . . .; the parity bit $P_2$ check the pair sets of positions (2, 3), (6, 7) (10, 11) . . .; the parity bit $P_3$ checks quadruple sets of positions; etc.

TABLE 1

| Parity Bits | Data Bit Locations |
|---|---|
| $P_1$ | $D_3$, $D_5$, $D_7$, $D_9$, $D_{11}$, $D_{15}$ |
| $P_2$ | $D_3$, $D_6$, $D_7$, $D_{10}$, $D_{11}$, $D_{14}$, $D_{15}$ |
| $P_3$ | $D_5$, $D_6$, $D_7$, $D_{12}$, $D_{13}$, $D_{14}$, $D_{15}$ |
| $P_4$ | $D_9$, $D_{10}$, $D_{11}$, $D_{12}$, $D_{13}$, $D_{14}$, $D_{15}$ |

The number of parity bits required for a given message length is given in Table 2. For example, if the original message is a binary coded decimal code (BCD) code word with n set equal to 4, three parity bits will be required with k equal to 3. This requires that positions 1, 2 and 4 in the coded message $M_{n+k}$ have the parity bits $P_1$, $P_2$ and $P_3$ inserted therefor. Thus, the transmitted Hamming code message will be seven bits long, as shown in Table 3 for the ten BCD code words, assuming even parity.

TABLE 2

| Number of Bits in Data Word $D_n$ | Minimum Number of Parity Bits $P_k$ | Total Length of Coded Message $M_{n+k}$ |
|---|---|---|
| 1 | 2 | 3 |
| 1-4 | 3 | 5-7 |
| 5-11 | 4 | 9-15 |
| 12-26 | 5 | 16-31 |
| 27-54 | 6 | 32-63 |

TABLE 3

| Decimal Digit | Position: BCD Position: Parity Bits: | 7 $D_4$ | 6 $D_3$ | 5 $D_2$ | 4 $D_1$ | 3 $P_3$ | 2 $P_2$ | 1 $P_1$ |
|---|---|---|---|---|---|---|---|---|
| 0 | | 0 | 0 | 0 | 0 | 0 | 0 | 0 |
| 1 | | 0 | 0 | 0 | 0 | 1 | 1 | 1 |
| 2 | | 0 | 0 | 1 | 1 | 0 | 0 | 1 |
| 3 | | 0 | 0 | 1 | 1 | 1 | 1 | 0 |
| 4 | | 0 | 1 | 0 | 1 | 0 | 1 | 1 |
| 5 | | 0 | 1 | 0 | 1 | 1 | 0 | 0 |
| 6 | | 0 | 1 | 1 | 0 | 0 | 1 | 0 |
| 7 | | 0 | 1 | 1 | 0 | 1 | 0 | 1 |
| 8 | | 1 | 0 | 0 | 1 | 0 | 1 | 1 |
| 9 | | 1 | 0 | 0 | 1 | 1 | 0 | 0 |

When the coded message is examined, the same parity is then applied to the received coded message $M_{n+k}$. A "checking number", "position number" or "syndrome number" S ($S_k S_{k-1} \ldots S_2 S_1$) is formed, such that, if no error is detected then S will have a value equal to zero. If, however, a single bit error is detected, then the decimal value of the binary number for $S_k$ will correspond to the position of the received message when the error occurred. This parity checking is illustrated in Table 4 wherein the positions $M_1$, $M_2$, $M_4$ and $M_8$ In the coded word correspond to the parity bits $P_1$, $P_2$, $P_3$ and $P_4$.

TABLE 4

| Syndrome number $S_k$ | Bit Locations Examined in Coded Message $M_{n+k}$ |
|---|---|
| $S_1$ | $(M_1), (M_3), (M_5), (M_7), (M_9),...$ |
| $S_2$ | $(M_2, M_3), (M_6, M_7), (M_{10}, M_{11}), (M_{14}, M_{15}),...$ |
| $S_3$ | $(M_4, M_5, M_6, M_7), (M_{12}, M_{13}, M_{14}, M_{15}),...$ |
| $S_4$ | $(M_8, M_9, M_{10}, M_{11}, M_{12}, M_{13}, M_{14}, M_{15}),...$ |

If the syndrome number $S_k$ specifies the position where an error appeared, then the various bits $S_j$ must check specific positions in the coded message $M_{n+k}$. If an error appears in an odd position (1, 3, 5, 7, 9, 11, . . .) in the coded message, then the least significant bit $S_1$ of the syndrome number $S_k$ must be equal to 1. If the coding was done such that in each Hamming code message all odd positions 1, 3, 5, 7, 9, 11, . . . have even parity, then a single error in one of these positions will form an odd parity. In this case, the least significant bit $S_1$ of the syndrome number will take the value of 1. If no error appears in these positions, then the parity check will shown even parity and $S_1$ will take the value of a zero. Similarly, the appearance of a single error in one of the positions 2, 3, 6, 7, 10, 11, . . . will indicate $S_2=1$, otherwise $S_2=0$, etc. Table 4 illustrates the specific positions of the received messages $M_{n+k}$ examined by the respective $S_j$'s. With $K$ such position number bits, $2^k$ different syndrome numbers S may be formed, where $2^k \geq n+k+1$. If, for example, the position number in the BCD messages using the Hamming code of Table 3 is $S=S_3 S_2 S_1=$"110", this signifies the appearance of an error in position $M_6$ of the received message, which in turn can then be corrected. If $S=0$, this implies that the message was received correctly.

To check the Hamming Code message with even parity for errors, it is necessary to compute the modulo-2 sum:

$$S_j = \Sigma M_j,$$

where $M_j$ represents the respective position bits of the received message to which the check $S_j$ is applied. If no error exists in the $M_j$ bits, then $S_j=0$, otherwise $S_j=1$. This procedures repeats for all $J=1, 2, 3, ...$ To further illustrate the Hamming code, Table 5 illustrates the Hamming code generation for a six bit message "101011", using even parity. The initial message is $D_6 D_5 ... D_1 = 101011$. Since n equals 6, it requires $k=4$ ($P_4 P_3 P_2 P_1$) parity bits, and it will thus be converted into a ten-bit Hamming code message. These parity bits $P_4, P_3, P_2$ and $P_1$ are placed in positions 8, 4, 2, 1, respectively, of the coded message M, respectively. The parity bits $P_1-P_4$ are determined by taking the modulo-2-sum, which operation is indicated by a "+" sign.

TABLE 5

| Coded Message Bit Positions: | $M_{10}$ | $M_9$ | $M_8$ | $M_7$ | $M_6$ | $M_5$ | $M_4$ | $M_3$ | $M_2$ | $M_1$ |
|---|---|---|---|---|---|---|---|---|---|---|
| Original Message Bit Positions: | $D_6$ | $D_5$ | | $D_4$ | $D_3$ | $D_2$ | | $D_1$ | | |
| Even Parity Bit Positions: | | | $P_4$ | | | | $P_3$ | | $P_2$ | $P_1$ |
| Original Data Message $D_n$: | 1 | 0 | | 1 | 0 | 1 | | 1 | | |
| $P_1 = M_3 + M_5 + M_7 + M_9 = 1$: | 1 | 0 | | 1 | 0 | 1 | | 1 | | 1 |
| $P_2 = M_3 + M_6 + M_7 + M_{10} = 1$: | 1 | 0 | | 1 | 0 | 1 | | 1 | 1 | 1 |
| $P_3 = M_5 + M_6 + M_7 = 0$: | 1 | 0 | | 1 | 0 | 1 | 0 | 1 | 1 | 1 |

TABLE 5-continued

| Coded Message Bit Positions: | $M_{10}$ | $M_9$ | $M_8$ | $M_7$ | $M_6$ | $M_5$ | $M_4$ | $M_3$ | $M_2$ | $M_1$ |
|---|---|---|---|---|---|---|---|---|---|---|
| $P_4 = M_9 + M_{10} = 1$: | 1 | 0 | 1 | 1 | 0 | 1 | 0 | 1 | 1 | 1 |
| Hamming Code Message M: | 1 | 0 | 1 | 1 | 0 | 1 | 0 | 1 | 1 | 1 |

To check the message M with an error in, for example, position 6, the message M will be output as 1011110111 instead of 1011010111. The syndrome generator bits are generated as follows:

$$S_1 = M_1 + M_3 + M_5 + M_7 + M_9 = 0$$

$$S_2 = M_2 + M_3 + M_6 + M_7 + M_{10} = 1$$

$$S_3 = M_4 + M_5 + M_6 + M_7 = 1$$

$$S_4 = M_8 + M_9 + M_{10} = 0$$

The syndrome number thus formed is $S = S_4 S_3 S_2 S_1 = 0110$. Its decimal value is 6, which indicates that an error exists in position 6 of the received message. This error can be corrected by changing bit $M_6$ from 1 to 0.

Figure 3:
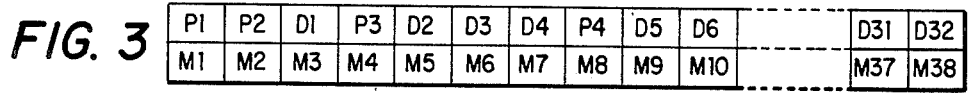
FIG. 3 illustrates the arrangement of data and parity bits in a collective data word stored in the memory.

Referring now to FIG. 3, there is illustrated a diagram of the actual arrangement of the data bits $D_1–D_{32}$ in the collective data word and the parity bits $P_1–P_6$ with their relative positions in the coded message M having bits $M_1–M_{38}$. Since the Hamming code requires the insertion of the parity bits in predetermined positions, the memory information array 10 and parity memory array 12 are interleaved such that the relative position of the bits is reflected in the physical layout of the arrays. Therefore, the array is arranged such that the column address decoders 22 and 24 are common and select a 38 bit word representing the coded message M which has the parity bits intertwined at positions $M_1$, $M_2$, $M_4$, $M_8$, $M_{16}$ and $M_{32}$. The separation of the parity bits and the collective data bits is facilitated by hardwiring the inputs of the sense amps 46 and 48 to the appropriate bit line.

As described above, in the preferred embodiment, the data information is comprised of an eight bit word and, for purposes of error correction, four of the eight bit data words are grouped together in a 32 bit collective data word. This is combined with six bits of parity to form the 38 bit coded message M. The parity bits are disposed in this message at positions 1, 2, 4, 8, 16 and 32. The parity bits are derived by establishing parity over the associated bits in the coded message as illustrated in Table 6. To generate the syndrome bits $S_1–S_6$, the following bits associated with each of the syndrome bits $S_1–S_6$ are combined with an exclusive OR function, as illustrated in Table 7. The parity bits $P_1–P_6$ are illustrated in parentheses next to their respective positions.

TABLE 6

| Parity Bits | Bit Position of Data Bits in Coded Message |
|---|---|
| $P_1 =$ | 3,5,7,9,11,13,15,17,19,21,23,25,27,29,31,33,35,37 |
| $P_2 =$ | 3,6,7,10,11,14,15,18,19,22,23,26,27,30,31,34,35,38 |
| $P_3 =$ | 5,6,7,12,13,14,15,20,21,22,23,28,29,30,31,36,37,38 |
| $P_4 =$ | 9,10,11,12 13,14,15,24,25,26,27,28,29,30,31 |
| $P_5 =$ | 17,18,19,20,21,22,23,24,25,26,27,28,29,30,31 |
| $P_6 =$ | 33,34,35,36,37,38 |

TABLE 7

| Syndrome Bits | Bit Position of Data and Parity Bits in Coded Message |
|---|---|
| $S_1 =$ | 1($P_1$),3,5,7,9,11,13,15,17,19,21,23,25,27,29,31,33,35,37 |
| $S_2 =$ | 2($P_2$),3,6,7,10,11,14,15,18,19,22,23,26,27,30,31,34,35,38 |
| $S_3 =$ | 4($P_3$),5,6,7,12,13,14,15,20,21,22,23,28,29,30,31,36,37,38 |
| $S_4 =$ | 8($P_4$),9,10,11,12,13,14,15,24,25,26,27,28,29,30,31 |
| $S_5 =$ | 16($P_5$), 17,18,19,20,21,22,23,24,25,26,27,28,29,30,31 |
| $S_6 =$ | 32($P_6$),32,33,34,35,36,37,38 |

If no errors are detected in the coded message, the error syndrome ($S_6 S_5 S_4 S_3 S_2 S_1$) will have a decimal value equal to zero. If there is a single bit error in the coded message, then the error syndrome will point to the defective bit. However, if a double error occurs, information read from the memory will contain multiple errors resulting in an unpredictable syndrome number. The error correcting capability of any Hamming code is equal to one bit; that is the Hamming code can detect and correct only a single bit error. Hamming codes are capable of detecting but not correcting two single bit errors. This one bit error detection will provide correction for one bit at random with at least one error still present. This error will be detected in the second pass during self test.

Figure 4:
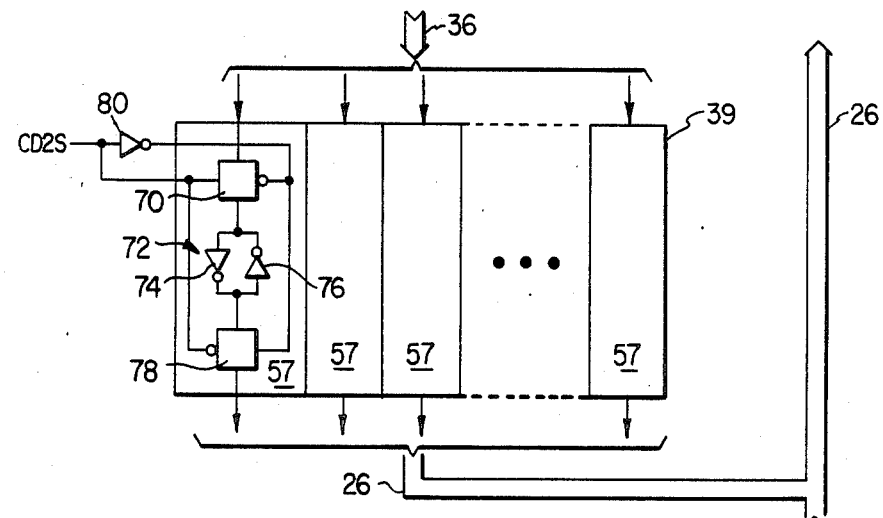
FIG. 4 illustrates a schematic block diagram of the multiplexing and latching portion of the memory.

Referring now to FIG. 4, there is illustrated a schematic block diagram of the latch 39 and multiplexer 27 wherein the function of the two is combined. The bus 36 has each of the 32 corrected collective bits therein input to a single bit latch circuit 57 of which one is associated with each of the 32 collective data word bits. The latch 56 is comprised of a first transfer gate 70 which is connected to a latch circuit 72 comprised of two parallel inverters 74 and 76 with the directions thereof being opposite to each other. The output of the latch 72 is connected to the associated bit of the bus 26 through a transfer gate 78. The signal CD2S is input to the positive input of the transfer gate 70 and the negative gate of the transfer gate 78. The signal CD2S is input through an inverter 80 to provide the compliment thereof to the negative input of the transfer gate 70 and the positive input of the transfer gate 78. Therefore, when CD2S is high, transfer gate 70 is on and transfer gate 78 is off. Conversely, when CD2S is low, transfer gate 70 is off and transfer gate 78 is on. This effectively latches the data into the latch 72 and then transfers it to the bus 26 as signal CD2S is pulsed active high.

The outputs of the sense amplifiers 46 are input to transfer gates 82 which are operable the isolate the output of the sense amps 46 from the bus 26. The signal R2S is connected to the positive inputs of all the transfers gates 82 and the compliment of R2S formed with an inverter 83 and connected to the negative inputs of the transfer gate 82. The signal R2S is operable to isolate the sense amps 46 from the bus 26. The latch 41 and multiplexer 28 operate similar to the circuit of FIG. 4. The multiplexing operation of multiplexer 27 is provided in part by the transfer gate 78 and in part by the transfer gates 82 and the latching function is provided by transfer gate 70 and latching circuit 72.

Referring now to FIG. 5, there is illustrated a portion of the syndrome generator 50 for generating the syndrome bit $S_6$. With reference to Table 6, it can be seen that the syndrome bit $S_6$ is formed from performing an exclusive OR function on the bit positions 32 through 38 in the coded message. As can be seen from FIG. 5, $P_6$ is disposed at position $M_{32}$ in the coded message and the data bits $D_{27}$-$D_{32}$ in the collective data word are disposed at positions $M_{33}$-$M_{38}$ in coded message. The bit position $M_{32}$ and the bit position $M_{33}$ in the coded message are both input to an exclusive OR gate 84, the output of which is connected to one input of an exclusive OR gate 86. Bit positions $M_{34}$ and $M_{35}$ are input to an exclusive OR gate 88, the output of which is connected to one input of an exclusive OR gate 90. The bit positions $M_{36}$ and $M_{37}$ are input to an exclusive OR gate 92, the output of which is connected to the other input of the exclusive OR gate 86. The other input of the exclusive OR gate 90 is connected to bit position $M_{38}$. The outputs of exclusive OR gates 86 and 90 are connected to the inputs of an exclusive OR gate 94, the output of which comprises the syndrome bit $S_6$. Although the circuitry for performing the exclusive OR function on the remaining syndrome bits $S_1$, $S_2$, $S_4$, $S_8$ and $S_{16}$ is not illustrated, it is configured in a similar manner to that of FIG. 5 for syndrome bit $S_6$.

Referring now to FIG. 6, there is illustrated a schematic diagram of the error correct decode circuit 54 and error correct circuit 34. The syndrome generator 50 outputs both the true and the compliment form of the syndrome bits $S_1$-$S_6$. Each of the bits positions in the coded data word is decoded by a multiple input AND gate 98.

The AND gate 98 associated with the first bit at position $M_1$ comprised of the parity bit $P_1$ of the coded data word has six inputs. The six inputs thereof are connected to the error syndrome bus 52. Of the six inputs, one is connected to $S_1$ and the remaining are connected to the inverse thereof. Therefore, when the error syndrome generator 50 generates a six bit word having the first bit thereof high and the remaining bits low, this indicates the decimal value of "1." This corresponds to position $M_1$ and AND gate 98 will select therefor. In a similar manner, a six input AND gate 100 is provided for position $M_2$ comprised of parity bit $P_2$, a six input AND gate 102 is provided for position $M_3$ comprised of data bit $D_1$ and a six input AND gate 104 is provided for position $M_4$ comprised of parity bit $P_3$. The remaining positions $M_5$-$M_{38}$ have six input AND gates 106 associated therewith.

The data bus 26 with the 32 bit collective data word thereon and the data bus 28 with the six bits of parity information thereon are combined into a single data bus 82. Each bit of the data bus 82 is input to an exclusive OR gate 110. The other input of the exclusive OR gate 110 is associated with one of the AND gates 98-106 and the associated one of the output positions $M_1$-$M_{38}$. For example, the output of the OR gate associated with the AND gate 98 corresponds to position $M_1$ comprised of parity bit $P_1$. The OR gates 110 provide the data inversion if the output of the respective AND gates 98-106 is high, this indicating an error. For example, if the output of the associated one of the AND gates 98-106 is high, this indicates an error and the output will be the inversion of the input connected to the data bus 82. The output on bus 36 will therefore constitute a corrected data word and associated parity bits, provided only a single bit error has occurred.

The device error detect circuit 43 is comprised of a six input OR gate 112, the output of which is connected to one input of a two input AND gate 114. The six inputs of the OR gate 112 are connected to the outputs $S_1$-$S_6$ of the syndrome generator 50. The other input of the AND gate 114 is connected to the enable signal STEN. The output of the AND gate 114 comprises the System Error signal.

Figure 7:
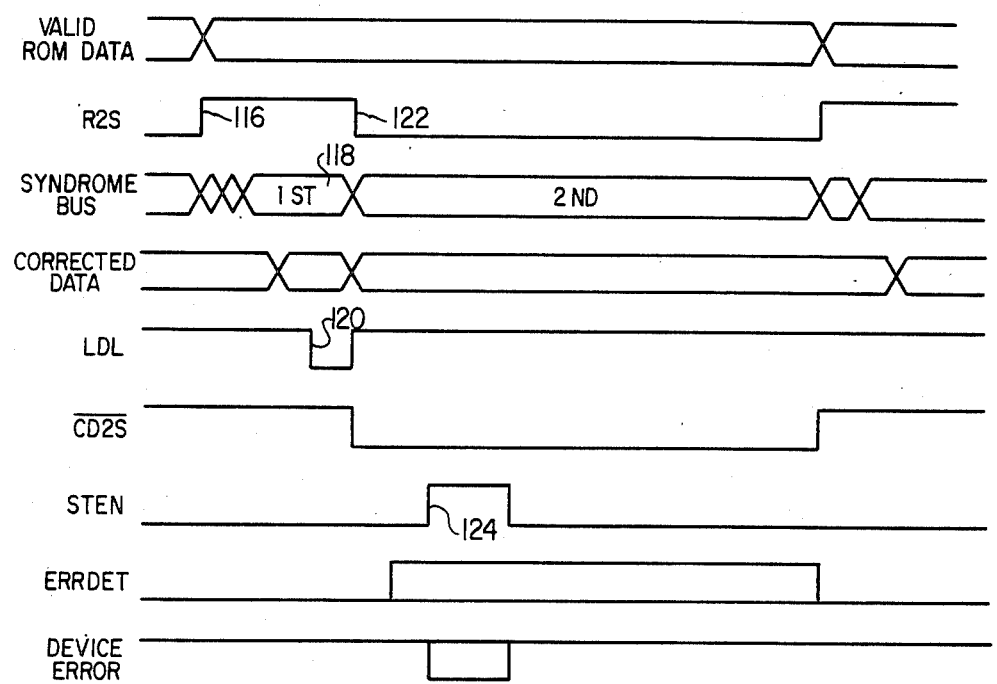
FIG. 7 illustrates timing diagrams for self testing the ROM.

Referring now to FIG. 7, there is illustrated a timing diagram for the self test operation. When valid ROM data is present, R2S goes high, as noted by a transition 116, and data is output from the ROM to the error syndrome generator 50. After a predetermined amount of time, the first error syndrome is generated, as represented by a reference numeral 118. During this time period, data is corrected and then signal LDL goes low, as represented by a transition 120 and the corrected collective data words and parity bits are loaded into latches 39 and 41. R2S then goes low, as indicated by a transition 122, the compliment of CD2S goes low and LDL goes high. This places the corrective collective data words and parity bits onto the buses 26 and 28 and constitutes the second pass. After a predetermined amount of time during the second pass, STEN goes high, as indicated by a transition 124 enabling the system error signal to be output. This signal can be output on a dedicated pin or multiplexed with another operation that is not necessary for self test operation of the ROM. An external latch can then be utilized to latch this information.

Figure 8:
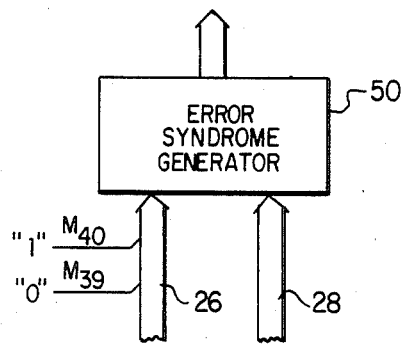
FIG. 8 illustrates an alternate embodiment of the present invention.

Referring now to FIG. 8, there is illustrated an alternate embodiment of the present invention, wherein like numerals refer to like parts in the various Figures. In certain situations, a fault results from a broken word line wherein the output is indeterminate. Normally, the word line will float either high or low, thus ouputting all "1's" or "0's". In this condition, the error will not be detected. This is the result of utilizing the Hamming Code wherein a data word having all but "1's" therein will have all "1's" for the parity bits. Conversely, a data word with all "0's" will have all "0's" for the parity bits. In order to account for this failure mode, the code word is expanded by two bits to a 40 bit coded data word. The positions $M_{39}$ and $M_{40}$ are set to a logic state of "0" and "1" for input to the error syndrome generator 50, as illustrated in FIG. 8. The bit positions $M_{39}$ and $M_{40}$ correspond to additional data bits $D_{33}$ and $D_{34}$ in the collective data word. By increasing the length of the coded data word by two bits which are not both "0" and not both "1", the occurrence of all "1's" or "0's" is prevented. In addition, by "hardwiring" these two positions bits on the input to the error syndrome generator 50, it is not necessary to utilize additional memory space. However, when generating the parity bits, it is necessary to account for these two additional bits. Therefore, the two bits must be input to the error syndrome generator 50 in order to output the appropriate error syndrome.

In summary, there has been provided a self testing ROM which requires accessing of the data in two passes. In the first pass, the data is accessed and input to an error detect/correct circuit for correction of the data. The correct data is then reinput to the error detect/correct circuit to determine if an error still exists. If an error exists, then too many errors existed in the initial accessed data word for correction by the error correction code utilized in the error detect/correct circuit. This error during the second pass is detected and a signal output to indicate that there is an error. To test an entire array, it is only necessary to step therough each of the memory locations and perform the self test on the accessed information. This alleviates the need to compare output data with a manufacturer's program to determine if the memory is good.

Although the present embodiment has been described in detail, it should be understood that various changes, substitutions and alterations can be made therein without departing from the spirit and scope of the invention as defined by the appended claims.

What is claimed is:

1. A self testing semiconductor memory, comprising:
   first storage means for storing a plurality of digital data words;
   second storage means for storing digital error checking information corresponding to each of said data words stored in said first storage means, said digital error information generated in accordance with a block error code algorithm, said data in said first storage means and said associated error checking information forming a coded data word;
   access means for accessing one of said coded data words in said first and second storage means;
   error detect means for detecting an error in a coded data word in accordance with said block error code algorithm and generating an error syndrome indicating the bit position of the detected error;
   error correction means for receiving the error syndrome and the coded data word and correcting the bit in error;
   multiplexing means, having a first input connected to the output of said error correction means, having a second input connected to the output of said access means, and having an output connected to the input of said error detect means, for selecting either said accessed one of said coded data words or the corrected one of said coded data words for input to said error detect means;
   self test means for controlling said access means during a first pass to access one of said coded data words for input to both said multiplexing means and said error correction means, and for controlling said multiplexing means to select said accessed one of said coded data words for input to said error detect means;
   said self test means during a second and subsequent pass controlling said multiplexing means to select the corrected coded data word output of said error correct means for input to said error detect means to determine if an error is still present; and
   system error detect means for receiving the generated error syndrome output by said error detect means during said second pass to determine if an error is present, a system error signal generated to indicate this error.

2. The semiconductor memory of claim 1 wherein said block code error code comprises a Hamming code.

3. The semiconductor memory of claim 1 wherein said first and second storage means comprise a memory array for storing said coded data words therein, the bits of said error correcting information comprising parity bits generated in accordance with a Hamming code and interleaved into predetermined bit positions in said coded data word in accordance with said Hamming code.

4. The semiconductor memory of claim 1 wherein said block code error algorithm detects only single errors in said coded data word.

5. The semiconductor memory of claim 1 wherein said coded data word is comprised of a collective data word stored in said first storage means and associated error checking information stored in said second storage means, said collective data word comprised of a plurality of said digital data words having a bit length less than said collective coded data word such that error detection and correction is performed on said collective data words and associated error checking information and further comprising means for selecting one of the said digital data words from said corrected collective data word for output from the semiconductor memory after accessing of said coded data word and error detection and correction thereof.

6. The semiconductor memory of claim 1 and further comprising means for inputting an additional two data bits to said error detect means having opposite and predetermined logic states, said opposite and predetermined logic states utilized in generating the associated parity information wherein said two additional bits comprise two additional bits of said data stored in said first storage means and utilized to generate said error checking information, said two additional bits preventing all of the bits input to said error detect means from being at one logic state.

7. A self testing semiconductor memory, comprising:

memory array means for storing a plurality of coded data words, said coded data words comprising an information portion having a first bit length and a parity portion generated in accordance with a Hamming error detect/correct code, said parity portion corresponding to said information portion and the bit length of said parity portion determined by the number of bits in said information portion;

access means for receiving an external address corresponding to a select one of said coded data words and accessing the select one of said coded data words for output therefrom;

syndrome generator means for receiving one of said coded data words and detecting the presence of an error therein in accordance with said Hamming error detect/correct code, said syndrome generator means generating a digital error syndrome word having information contained therein representing the bit position in said coded data word at which the detected error resides;

error correct means for receiving said error syndrome word and said coded data word and inverting a logic state of the bit at the position in said coded data word determined to be in error by said syndrome generator means;

multiplexing means for selecting between the output of said error correct means and the output of said access means for input to said syndrome generator means for inputting either an uncorrected one of said coded data words from said access means or a corrected one of said coded data words from said error correct means thereto;

self test means for controlling said access means to access a select one of said coded data words during a first pass and controlling said multiplex means to select the output of said access means for inputting said accessed coded data word to said error detect means;

said self test means during a second and subsequent pass controlling said multiplex means to select the output of said error correct means for input to said error detect means, said error syndrome word output by said error detect means during said second pass indicating an error if the error in the select one of said coded data words selected in said first pass was not corrected, an error in said second pass resulting from errors in said coded data word that are uncorrectable by said Hamming error detect/correct code; and system error detect means for detecting an error in said error syndrome word during said second pass and indicating a system error if an error is present.

8. The semiconductor memory of claim 7 wherein said Hamming code corrects only a single bit error in said coded data word.

9. The semiconductor memory of claim 7 wherein:

said array means comprises a memory array for storing said coded data words in rows and columns; and said access means comprises a row decoder for selecting a row in said memory array and a column decoder for selecting a column in said memory array for outputting one of said coded data words.

10. The semiconductor memory of claim 7 wherein:

said error correct means comprises a decoder for decoding said digital error syndrome word and outputting a plurality of bit error detect signals, one bit error detect signal associated with each of the bits in said coded data word, said bit error detect signals being mutually exclusive such that only one bit error can be corrected; and an exclusive OR correction circuit associated with each of the bits in said coded data word for receiving the associated bit of said accessed coded data word and inverting the associated bit of said accessed coded data word when the logic state of the associated one of said bit error signals indicates an error.

11. The semiconductor memory of claim 7 wherein said multiplex means comprises:

latch means for receiving and latching the output of said error correct means during said first pass;

transfer gate means for transferring said latched data in said latch means to the input of said error detect means during said second pass; and isolation means for isolating the output of said access means from the input of said error detect means during said second pass.

12. The semiconductor memory of claim 7 wherein the information portion of said coded data word further comprises two fixed data bits having opposite logic states therefor, the parity portion of said coded data word generated with said two additional bits in said information portion, said two additional data bits hardwired to the input of said error detect means such that they are not stored in said array means, defects in said array means wherein all data bits exist at one logic state not affecting said two additional bits input to said error detect means.

13. A method for self testing a semiconductor memory, comprising:

storing coded data words in a memory array, the coded data words having an information portion and a parity portion, the parity portion providing error checking information for the information portion and generated in accordance with a block code error detect/correct algorithm and having a bit length determined by the bit length of the information portion;

predetermining two additional bits in the information portion of the coded data word;

accessing one of the coded data words;

detecting an error in the accessed coded data word and generating an error syndrome in accordance with the block code error algorithm during a first pass;

decoding the error syndrome and correcting the coded data word in accordance with the error syndrome by inverting the bit at the position determined to be in error during the first pass;

detecting an error in the corrected coded data word during a second pass and generating an error syndrome for the corrected coded data word in accordance with the block code error algorithm;

detecting the presence of an error during the second pass to determine if the error was not corrected during the first pass; and indicating the presence of an error during the second pass;

wherein said predetermined two additional bits are for error detection thereon during the first and second passes, the associated parity portion determined as a function of the two additional information bits, the two additional bits independently input to the error correcting step without requiring accessing thereof such that errors in the array are not reflected in the two additional bits.

* * * * *